(12) United States Patent
Ihn et al.

(10) Patent No.: US 11,493,384 B1
(45) Date of Patent: Nov. 8, 2022

(54) APPARATUS FOR SINGLE-PIXEL IMAGING WITH QUANTUM LIGHT

(71) Applicant: AGENCY FOR DEFENSE DEVELOPMENT, Daejeon (KR)

(72) Inventors: Yong Sup Ihn, Daejeon (KR); Sangkyung Lee, Daejeon (KR); Yonggi Jo, Daejeon (KR); Taek Jeong, Daejeon (KR); Duk Young Kim, Daejeon (KR); Junghyun Kim, Daejeon (KR); Dongkyu Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/660,062

(22) Filed: Apr. 21, 2022

(30) Foreign Application Priority Data

Jun. 22, 2021 (KR) .......................... 10-2021-0081055

(51) Int. Cl.
*G02F 1/35* (2006.01)
*G02F 1/39* (2006.01)
(Continued)

(52) U.S. Cl.
CPC ............... *G01J 1/44* (2013.01); *G01J 1/0429* (2013.01); *G02F 1/3503* (2021.01);
(Continued)

(58) Field of Classification Search
None
See application file for complete search history.

(56) References Cited

U.S. PATENT DOCUMENTS 8,244,082 B2 * 8/2012 Pacher .................. H04L 9/0858
385/11
8,433,200 B2 4/2013 Arahira
(Continued)

FOREIGN PATENT DOCUMENTS

JP 4523365 B 8/2010
JP 2011-109302 A 6/2011
(Continued)

OTHER PUBLICATIONS

F. Severini, F. Madonini and F. Villa, "Analysis of a quantum imaging system based on SPAD detection," 2021 Conference on Lasers and Electro-Optics Europe & European Quantum Electronics Conference (CLEO/Europe-EQEC), 2021, pp. 1. (Year: 2021).*
(Continued)

*Primary Examiner* — Rhonda S Peace
(74) *Attorney, Agent, or Firm* — Finch & Maloney PLLC (57) ABSTRACT

Disclosed is an apparatus for single-pixel imaging using quantum light, the apparatus including: a light source which generates a photon pair through spontaneously parametric down conversion of a non-linear crystal and splits the photon pair into an idler photon of first polarized light and a signal photon of second polarized light; a signal processing unit which aligns the signal photon with the first polarized light and modulates the signal photon with a pattern of a spatial light modulator, and sends the modulated signal photon to a target; and a signal detecting unit which simultaneously measures signal photons collected after an interaction of the idler photon and the target to obtain an image.

9 Claims, 4 Drawing Sheets

(51) Int. Cl.
    *G01J 1/04*     (2006.01)
    *G01J 1/44*     (2006.01)
    *G02F 1/355*     (2006.01)

(52) U.S. Cl.
    CPC .......... *G02F 1/3526* (2013.01); *G02F 1/3553* (2013.01); *G02F 1/39* (2013.01); *G02F 2203/12* (2013.01)

(56) References Cited

U.S. PATENT DOCUMENTS

| | | | | |
|---|---|---|---|---|
| 9,798,006 | B2* | 10/2017 | Lanzagorta | ............. G01S 17/87 |
| 2018/0032896 | A1* | 2/2018 | Fleischer | ................ G06F 17/14 |

FOREIGN PATENT DOCUMENTS

| | | |
|---|---|---|
| JP | 4845131 B | 12/2011 |
| JP | 5541004 B | 7/2014 |
| KR | 10-1960425 B | 3/2019 |

OTHER PUBLICATIONS

J. L. Blanchet, F. Devaux, L. Furfaro and E. Lantz, "Purely spatial coincidences in parametric spontaneous down conversion," CLEO/Europe—EQEC 2009—European Conference on Lasers and Electro-Optics and the European Quantum Electronics Conference, 2009, pp. 1. (Year: 2009).*

Kim et al., "Heralded single-pixel imaging with high loss-resistance and noise-robustness", Appl. Phys. Lett. 119, 244002 (2021).

Bierlein et al., "Potassium titanyl phosphate: properties and new applications", J. Opt. Soc. Am. B, vol. 6, No. 4 (Apr. 1989).

Basset et al., "Perspectives for Applications of Quantum Imaging", Laser Photonics Rev. 2019, 13, 1900097 (2019).

Kim et al., "Quantum-enhanced computational ghost imaging", The 32rd Optical Society of Korea Winter Research Meeting in Virtual Conference, WP-VII-5 (Feb. 17, 2021).

Notice of Grounds for Rejection in Korea Patent Application 10-2021-0081055 (dated Sep. 24, 2021).

Notice of Allowance in Korea Patent Application 10-2021-0081055 (dated Jan. 7, 2022).

* cited by examiner

APPARATUS FOR SINGLE-PIXEL IMAGING WITH QUANTUM LIGHT

CROSS-REFERENCE TO RELATED APPLICATION

This application claims priority to and the benefit of Korean Patent Application No. 10-2021-0081055 filed in the Korean Intellectual Property Office on Jun. 22, 2021, the entire contents of which are incorporated herein by reference.

BACKGROUND

(a) Field

Embodiments of the present invention relates to a single-pixel imaging apparatus and an apparatus for generating a photon pair for the same, and more particularly, to a single-pixel imaging apparatus which improves noise vulnerability by using quantum light, and an apparatus for generating a photon pair for the same.

(b) Description of the Related Art

Precise imaging is a technology that is an important key for discovery in not only optics, but also life sciences, nanotechnology, astronomy, and chemistry.

In general imaging, the spatial distribution of light is read through a detector with spatial resolution just like taking a picture of light reflecting off an object and containing spatial information of the object. However, in this case, there is a disadvantage in that it is difficult to accurately create an image of the object if noise other than the light reflected by the object is mixed into the detector. In particular, imaging in a harsh environment where external noise is strong and loss of light emitted from the light source occurs is vulnerable to the problem of image quality degradation by classical methods. Unlike direct imaging that directly uses spatial information of light reflected from an object as described above, there is an imaging technique that indirectly composes an image by using a single-pixel detector and a spatial light modulator. This is called single-pixel imaging.

The above information disclosed in this Background section is only for enhancement of understanding of the background of the invention, and therefore it may contain information that does not form the prior art that is already known in this country to a person of ordinary skill in the art.

SUMMARY

Embodiments of the present invention has been made in an effort to implement an imaging system insensitive to external noise by using quantum light, and provide an apparatus for single-pixel imaging by using quantum light, which improves classical imaging vulnerable to external noise by using a temporal correlation property of quantum light to enable imaging of objects even in an environment with large noise and loss, and an apparatus for generating a photon pair for the same An exemplary embodiment of the present invention provides an apparatus for single-pixel imaging using quantum light, the apparatus including: a light source which generates a photon pair through spontaneously parametric down conversion of a non-linear crystal and splits the photon pair into an idler photon of first polarized light and a signal photon of second polarized light; a signal processing unit which aligns the signal photon as the first polarized light, modulates the signal photon to a pattern of a spatial light modulator, and sends the modulated signal photon to a target; and a signal detecting unit which simultaneously measures signal photons collected after an interaction of the idler photon and the target to obtain an image.

The photon pair may have a temporal correlation by the spontaneously parametric down conversion, and noise may be removed by the simultaneous measurement of the idler photon and the signal photon.

The light source may include: an optical fiber coupler on which a continuous wave laser is incident; a quarter wave plate and a half wave plate which cause horizontally polarized light to be incident on the non-linear crystal by adjusting a wavelength of the continuous wave laser in a horizontal direction; a dichroic mirror which reflects the continuous wave laser passing through the non-linear crystal and allows the photon pair to transmit; and a polarization beam splitter which splits the photon pair into the first polarized light and the second polarized light.

The light source may further include a temperature controller which adjusts a temperature of the non-linear crystal to meet a collinear condition in which the photon pair travels the same path as a path of an incident photon of the continuous wave laser.

The light source may further include an optical filter which allows only the photon pair to transmit and sends the transmitted photon pair to the polarization beam splitter.

The signal processing unit may include: a quarter wave plate and a half wave plate which align a signal photon of the second polarized light as the first polarized light and makes the aligned signal photon incident on the spatial light modulator; and a polarization beam splitter which filters a portion in which a polarization direction of the light emitted through the spatial light modulator is changed to make a spatial form of the light be the same as a pattern of the spatial light modulator.

The signal processing unit may further include a plurality of lens which adjusts a beam width of the signal photon incident on the spatial light modulator in accordance with a size of the spatial light modulator and adjusts a beam width of the signal photon having a pattern of the spatial light modulator.

The signal detecting unit may include: a first single photon counting module which is connected to a single mode optical fiber to which the idler photon is transmitted; a multi-mode optical fiber which collects the signal photon; and a second single photon counting module connected to the multi-mode optical fiber.

The signal detecting unit may further include a lens unit which decreases the beam width of the signal photo to an original beam width so that the signal photon is coupled to the multi-mode optical fiber.

The apparatus may further include an environment implementing unit for simulating noise and loss environments by using a half wave plate and a polarization beam splitter located in front of the target in an optical path of the signal photon sent to the target.

The environment implementing unit may further include: a laser oscillator which oscillates a laser of vertical polarization irrelevant to the signal photon; and a reflective mirror which makes the laser of the vertical polarization interact with an optical path of the signal photon to cause the laser be incident on the polarization beam splitter.

Another exemplary embodiment of the present invention provides an apparatus for generating a photon pair for an imaging apparatus, the apparatus including: a non-linear crystal causing spontaneously parametric down conversion; an optical fiber coupler on which a continuous wave laser is incident; a quarter wave plate and a half wave plate which adjust a wavelength of the continuous wave laser in a horizontal direction to cause horizontally polarized light to be incident on the non-linear crystal; a dichroic mirror which reflects the continuous wave laser passing through the non-linear crystal, and allows a photon pair generated through the spontaneously parametric down conversion of the non-linear crystal to transmit; and a polarization beam splitter which splits the photon pair into first polarized light and second polarized light.

The apparatus may further include a temperature controller which adjusts a temperature of the non-linear crystal to meet a collinear condition in which the photon pair travels the same path as a path of an incident photon of the continuous wave laser.

The apparatus may further include an optical filter which allows only the photon pair to transmit and sends the transmitted photon pair to the polarization beam splitter.

The non-linear crystal may be potassium titanyl phosphate which causes the spontaneously parametric down conversion and has a periodic polling structure.

The apparatus for single-pixel imaging according to the exemplary embodiment of the present invention may effectively image an object even in an environment in which large noise and loss exist by using quantum light.

The apparatus for single-pixel imaging may improve insensitivity to external noise by using a strong temporal correlation characteristic of quantum light and a single-pixel technique.

DETAILED DESCRIPTION

In the following detailed description, only certain exemplary embodiments of the present invention have been shown and described, simply by way of illustration. However, the present invention can be variously implemented and is not limited to the following embodiments.

Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising", will be understood to imply the inclusion of stated elements but not the exclusion of any other elements.

Figure 1:
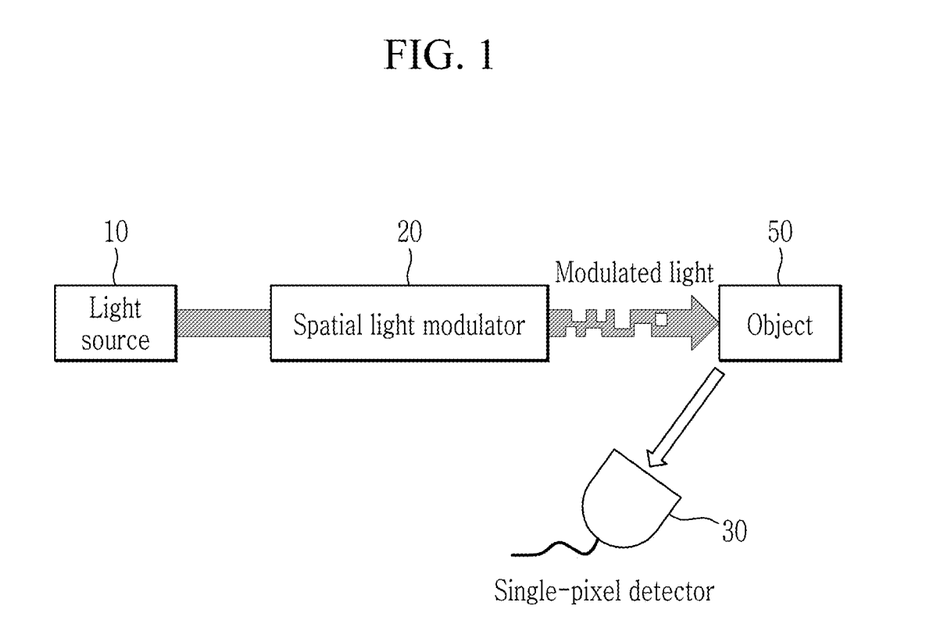
FIG. 1 is a conceptual diagram illustrating a general single-pixel imaging system.

FIG. 1 is a conceptual diagram illustrating a general single-pixel imaging system.

Referring to FIG. 1, a general single-pixel imaging system includes a light source 10, a spatial light modulator (SLM) 20, and a single-pixel detector 30.

The light source 10 emits coherent light, and the spatial light modulator 20 changes spatial distribution of light illuminating an object 50 according to an input pattern. The single-pixel detector 30 measures an intensity of light reflected from the object 50 and returned. An image of the object 50 may be obtained by recording the intensity of light measured in the single-pixel detector 30 for each pattern while changing the input pattern of the spatial light modulator 20 and then synthesizing the measurement results as represented in Equation 1.

$$R(i, j) = \langle P_k(i, j) I_k \rangle - \langle P_k(i, j) \rangle \langle I_k \rangle \qquad \text{(Equation 1)}$$
$$= \frac{1}{N} \sum_{k=1}^{N} P_k(i, j) I_k - \frac{1}{N} \sum_{k=1}^{N} P_k(i, j) \frac{1}{N} \sum_{l=1}^{N} I_l$$

Herein, $P_k$ means the $k^{th}$ pattern, $I_k$ means the intensity of light measured in the single-pixel detector 30 for a corresponding pattern, and N means the number of total patterns.

Equation 1 calculates a correlation between the input pattern and a signal measured by the single-pixel detector 30, so that there is an effect in that external noise independent from the pattern is removed. That is, it shows that the single-pixel imaging is stronger to external noise than direct imaging. However, even in the single-pixel imaging, when the intensity of external noise becomes very large, it is not possible to effectively block external noise only by calculating the correlation, and image quality deteriorates.

Hereinafter, an apparatus for single-pixel imaging by using quantum light according to an exemplary embodiment of the present invention will be described with reference to FIGS. 2 and 3.

Figure 2:
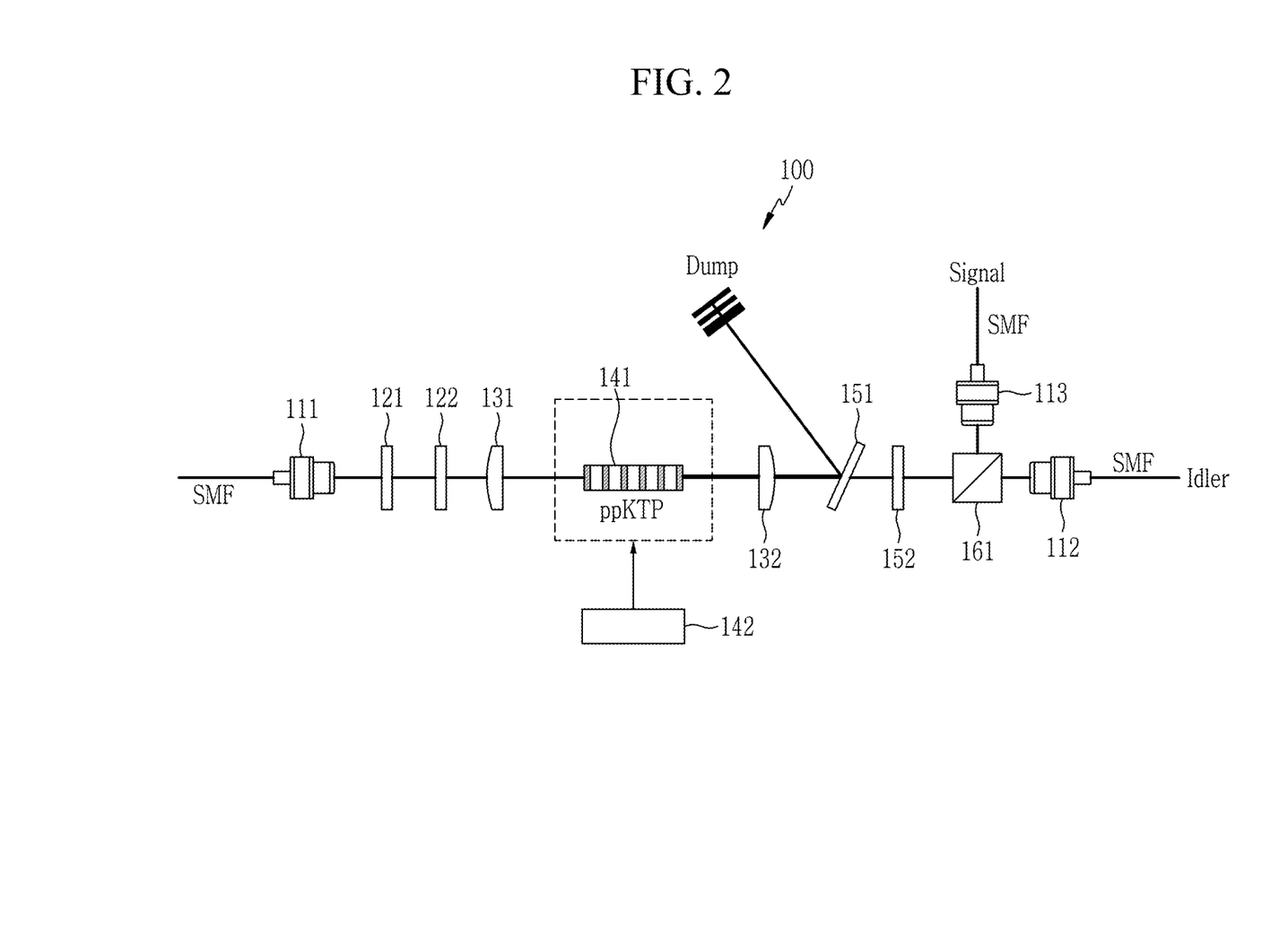
FIG. 2 is a block diagram illustrating a light source for generating a photon pair according to an exemplary embodiment of the present invention.
Figure 3:
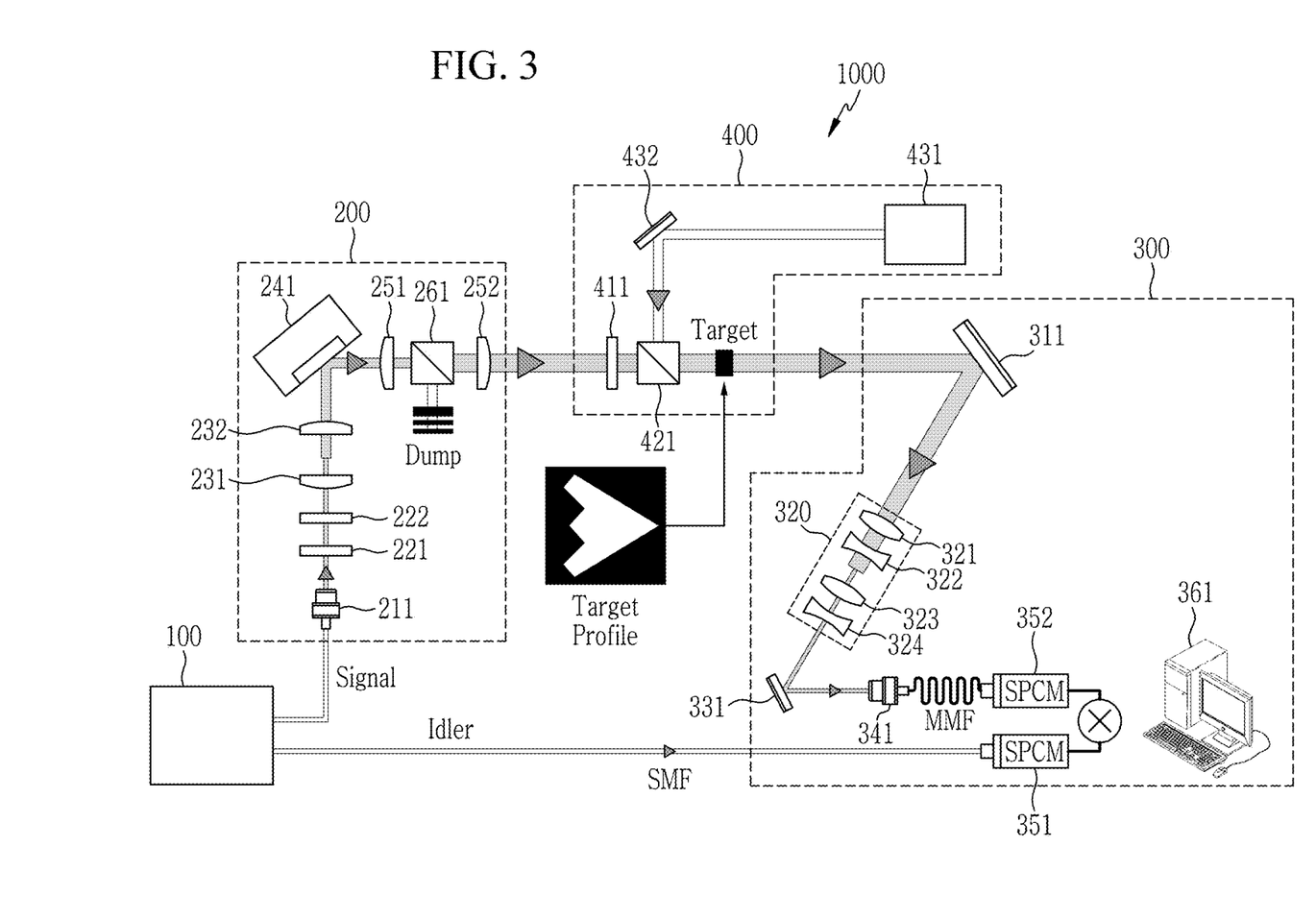
FIG. 3 is a block diagram illustrating an apparatus for single-pixel imaging by using quantum light according to an exemplary embodiment of the present invention.

FIG. 2 is a block diagram illustrating a light source for generating a photon pair according to an exemplary embodiment of the present invention. FIG. 3 is a block diagram illustrating an apparatus for single-pixel imaging by using quantum light according to an exemplary embodiment of the present invention.

First, a light source 100 for generating a photon pair will be described with reference to FIG. 2. The light source 100 may refer to as a photon pair generating device for an imaging apparatus.

The light source 100 may include a first optical fiber coupler 111, a second optical fiber coupler 112, a third optical fiber coupler 113, a non-linear crystal 141, a temperature controller 142, a first polarizing beam splitter (PBS) 161, and a plurality of optical devices located in an optical path. The plurality of optical devices may include a first quarter wave plate (QWP) 121, a first half wave plate (HWP) 122, a first lens 131, a second lens 132, a dichroic mirror 151, and an optical filter 152. The first quarter wave plate (QWP) 121, the first half wave plate 122, and the first lens 131 may be sequentially disposed between the first optical fiber coupler 111 and the non-linear crystal 141. Further, the second lens 132, the dichroic mirror 151, and the optical filter 152 may be sequentially disposed between the non-linear crystal 141 and the first polarizing beam splitter 161.

The first optical fiber coupler 111 is connected to a single mode fiber (SMF), and may cause a continuous wave laser incident through the single mode fiber to be incident toward the non-linear crystal 141. The continuous wave laser may be a laser of 405 nm.

The first quarter wave plate 121 and the first half wave plate 122 serve to accurately adjust the wavelength of the continuous wave laser (405 nm laser) in a horizontal direction so that horizontally polarized light is incident on the non-linear crystal 141. The first lens 131 and the second lens 132 serve to effectively cause the continuous wave laser (405 nm laser) to be incident on the non-linear crystal 141.

The non-linear crystal 141 may be periodically poled potassium titanyl phosphate (ppKTP) causing Spontaneous Parametric Down Conversion (SPDC) and having a periodic poling structure. When the continuous wave laser (405 nm laser) is incident on the non-linear crystal 141 as the horizontally polarized light, SPDC occurs and one incident photon of the continuous wave laser (405 nm laser) produces two photons of which wavelength is converted by the SPDC. The two photons of which the wavelength is converted may be a degenerated photon pair having a wavelength of 810 nm.

The temperature controller 142 may adjust an angle at which the photon pair is emitted by adjusting a temperature of the non-linear crystal 141. The temperature controller 142 may set the temperature of the non-linear crystal 141 to approximately 34° C. to meet a collinear condition in which both photons travel in the same path as the path of the incident photon of the continuous wave laser (405 nm laser). That is, the continuous wave laser (405 nm laser) and the photon pair may travel along the same path.

The dichroic mirror 151 serves to pass only light having a specific wavelength or higher. The dichroic mirror 151 may reflect the continuous wave laser (405 nm laser) passing through the non-linear crystal 141 and transmit the photon pair. For example, a cut-off wavelength of the dichroic mirror 151 may be a 650 nm wavelength, and the continuous wave laser of 405 nm is may be reflected by the dichroic mirror 151 and removed by a dump, and the photon pair of 810 nm may transmit the dichroic mirror 151.

The optical filter 152 serves to transmit light of a specific wavelength. The optical filter 152 may transmit only light of a wavelength corresponding to the wavelength of the photon pair. For example, the optical filter 152 may transmit only the photon pair of 810 nm and send the transmitted photon pair to the first polarizing beam splitter 161.

The first polarizing beam splitter 161 splits a pair of photons of opposite polarizations. One in the pair of photons may be horizontally polarized light (first polarized light) polarized in the horizontal direction, and the other one in the pair of photons may be vertically polarized light (second polarized light) polarized in the vertical direction, and the horizontally polarized light may pass through the first polarization beam splitter 161 and be incident on the second optical fiber coupler 112 and the vertically polarized light may be refracted by the first polarization beam splitter 161 and be incident on the third optical fiber coupler 113. The horizontally polarized light may be called an idler and the vertically polarized light may be called a signal. The idler and the signal may be sent to the single mode fiber (SMF) of different paths through the second optical fiber coupler 112 and the third optical fiber coupler 113.

Next, an apparatus 1000 for single-pixel imaging with quantum light including the light source 100 will be described with reference to FIG. 3.

The apparatus 1000 for single-pixel imaging with quantum light according to the exemplary embodiment of the present invention may include the light source 100, a signal processing unit 200, and a signal detecting unit 300. In the exemplary embodiment of the present invention, an environment implementing unit 400 for simulating noise and loss environments is added to the apparatus 1000 for single-pixel imaging. In the case where an actual target is imaged, the environment implementing unit 400 may be omitted.

The signal processing unit 200 may include a fourth optical fiber coupler 211, a Spatial light modulator 241, a second polarization beam splitter 261, and a plurality of optical devices located on the optical path. The plurality of optical devices may include a second quarter wave plate 221, a second half wave plate 222, a third lens 231, a fourth lens 232, a fifth lens 251, and a sixth lens 252. The second quarter wave plate 221, the second half wave plate 222, the third lens 231, and the fourth lens 232 may be sequentially disposed between the fourth optical fiber coupler 211 and the Spatial light modulator 241. Further, the fifth lens 251 may be disposed between the Spatial light modulator 241 and the second polarization beam splitter 261, and the sixth lens 252 may face the fifth lens 251 with the second polarization beam splitter 261 interposed therebetween.

The signal detecting unit 300 may include a first reflective mirror 311, a lens unit 320, a second reflective mirror 331, a fifth optical fiber coupler 341, a multi-mode fiber (MMF), a first single photon counting module (SPCM) 351, a second SPCM 352, and a signal processor 361. The lens unit 320 is for the purpose of adjusting the size of a beam, and may include a plurality of lens 321, 322, 323, and 324. The lens unit 320 may be disposed between the first reflective mirror 311 and the second reflective mirror 331. Further, the fifth optical fiber coupler 341 and the MMF may be sequentially disposed between the second reflective mirror 331 and the second SPCM 352. The first SPCM 351 is connected with the SMF to which the idler photon of the light source 100 is transmitted.

The environment implementing unit 400 may include the third half wave plate 411, a third polarization beam splitter 421, a laser oscillator 431, and a third reflective mirror 432. The third half wave plate 411 and the third polarization beam splitter 421 are positioned in front of a target on the optical path of the signal photon sent to the target, and the third reflective mirror 432 is disposed so that the laser emitted from the laser oscillator 431 intersects the optical path of the signal photon and is incident on the third polarization beam splitter 421.

The target may be positioned between the signal processing unit 200 and the signal detecting unit 300, particularly, between the sixth lens 252 of the signal processing unit 200 and the first reflective mirror 311 of the signal detecting unit 300. When the environment implementing unit 400 for simulating the noise and loss environment is added, the target may be positioned between the third polarization beam splitter 421 of the environment implementing unit 400 and the first reflective mirror 311 of the signal detecting unit 300, and in this case, the target may be selected from a target profile to simulate the actual target. Herein, as the target, a pierced beam shield in the shape of a stealth aircraft is exemplified.

Now, a process of imaging a target by the apparatus 1000 for single-pixel imaging using quantum light will be described.

The idler photon is sent directly to the first SPCM 351 through the SMF without any direction interaction with the target.

The signal photon is sent to the fourth optical fiber coupler 211 through the SMF, and is sent to the Spatial light modulator 241 through the second quarter wave plate 221, the second half wave plate 222, the third lens 231, and the fourth lens 232. The second quarter wave plate 221 and the second half wave plate 222 aligns the polarization direction of the signal photon of the second polarized light incident on the Spatial light modulator 241 as horizontally polarized light (first polarized light). The third lens 231 and the fourth lens 232 may adjust (enlarge) a beam width of the signal photon incident on the Spatial light modulator 241 in accordance with the size of the Spatial light modulator 241. For example, the third lens 231 and the fourth lens 232 may enlarge the beam width of the signal photon two times.

The Spatial light modulator 241 changes the polarization according to the pattern input when the polarization of the incident light is well defined. For example, when the light emitted through the Spatial light modulator 241 is viewed, the polarization direction of the black portion of the pattern may be reversed and the polarization of the white portion may be maintained. When the light emitted through the Spatial light modulator 241 passes through the second polarization beam splitter 261, the portion (vertical polarization) in which the polarization direction is changed is filtered out, and the spatial shape of the light becomes the same as the pattern input to the Spatial light modulator 241. That is, the signal photon is modulated to the pattern of the Spatial light modulator 241. The fifth lens 251 and the sixth lens 252 may adjust (enlarge) the beam width of the signal photon having the pattern of the Spatial light modulator 241 in accordance with the size of the target before the signal photon is incident on the target.

Thereafter, the signal photon is sent to the target.

The environment implementing unit 400 may adjust transmittance of the target with the third half wave plate 411 and the third polarization beam splitter 421 in front of the target. The light emitted through the Spatial light modulator 241 and the second polarization beam splitter 261 is aligned as the horizontally polarized light, so that the when the polarization direction is turned by the third half wave plate 411, a part of the light is filtered in the third polarization beam splitter 421. Through this, the loss of the signal photons may be simulated.

The environment implementing unit 400 may implement external noise with the laser oscillator 431 and the third reflective mirror 432 irrelevant to the signal photon. When an independent 810 nm wavelength laser irrelevant to the signal photon is aligned as the vertical polarized light and is oscillated in the laser oscillator 431 and the laser of the vertical polarization is incident on the third polarization beam splitter 421 by the third reflective mirror 432, the laser is reflected from the third polarization beam splitter 421 and travels the same path as that of the signal photon. The laser of the vertical polarization is an unnecessary photon added in addition to the signal photon, and acts as external noise.

The signal photon and the external noise may interact (penetrate or reflect) with the target and then is coupled to the MMF of the signal detecting unit 300 to be detected by the second SPCM 352. The fifth optical fiber coupler 341 couples the signal photon and the light included in the external noise to the MMF. Since the MMF has very high coupling efficiency than that of the SMF, the MMF is capable of collecting more signal photons. In this case, the lens unit 320 may serve to decrease the beam width of the signal photon to the original beam width so that the signal photon is capable of being coupled to the MMF by using the plurality of lens 321, 322, 323, and 324.

The first SPCM 351 and the second SPCM 352 simultaneously perform the measurement, and it is possible to obtain an effect of removing noise from the signal in which the noise is mixed by a narrow time span of the simultaneous measurement of 700 ps or less. Since the photon pair generated by the SPDC has strong temporal correlation, both photon pairs may come between the very narrow time spans of the simultaneous measurement, but the photon of the external noise have no temporal relation with the idler photon at all, so that the number of photons capable of entering the time span of the simultaneous measurement is greatly reduced. Therefore, only the external noise may be effectively filtered. The signal processor 361 may acquire an image by inputting the pattern to the Spatial light modulator 241 and substituting the number of photons obtained through the simultaneous measurement to foregoing Equation 1.

Hereinafter, an image obtained through a general (classical) single-pixel imaging system and an image obtained through the apparatus 1000 for single-pixel imaging using quantum light according to the exemplary embodiment of the present invention will be compared and described with reference to FIGS. 4 and 5.

Figure 4:
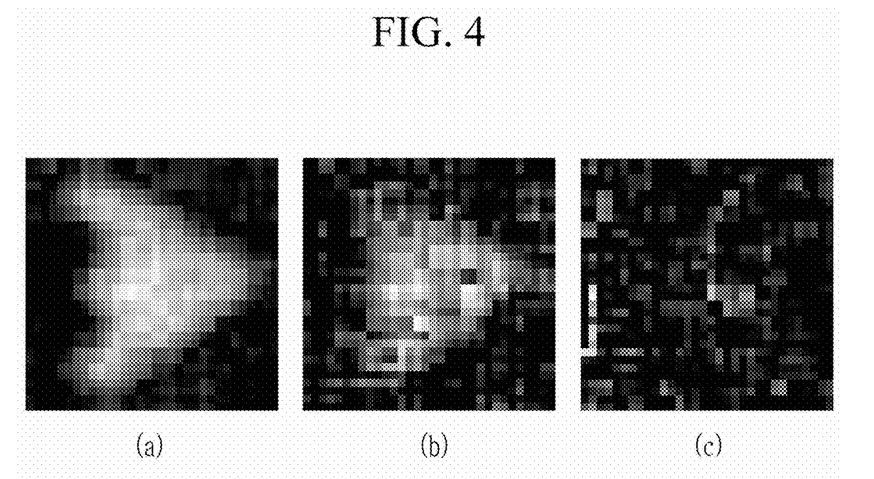
FIG. 4 is a diagram illustrating an example of an image obtained through the general single-pixel imaging system.

FIG. 4 is a diagram illustrating an example of an image obtained through the general single-pixel imaging system. FIG. 5 is a diagram illustrating an example of an image obtained through the apparatus for single-pixel imaging by using quantum light according to the exemplary embodiment of the present invention.

In FIG. 4, (a) is an image obtained in the general single-pixel imaging system when the intensity of noise is 0, (b) is an image obtained in the general single-pixel imaging system when the intensity of noise is 50, and (c) is an image obtained in the general single-pixel imaging system when the intensity of noise is 70 and there is a 50% loss. The intensity of noise represents a ratio of noise for the average intensity of the signal photons measured in the detector.

Figure 5:
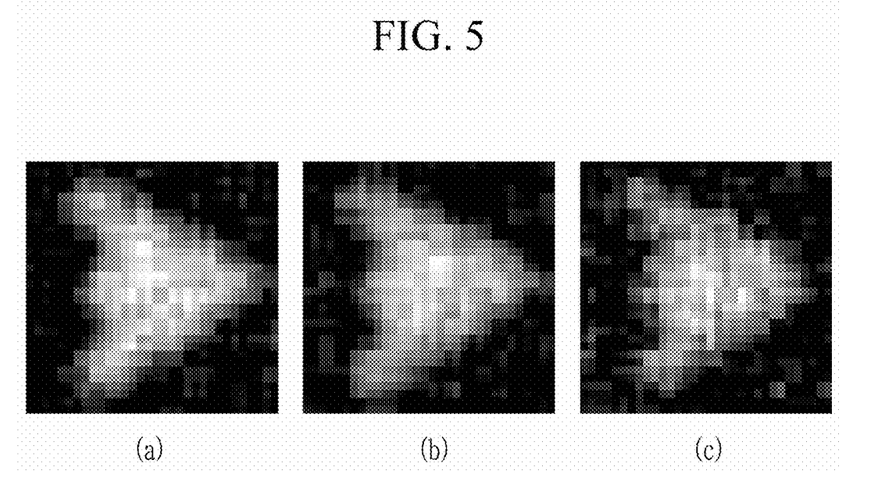
FIG. 5 is a diagram illustrating an example of an image obtained through the apparatus for single-pixel imaging by using quantum light according to the exemplary embodiment of the present invention.

In FIG. 5, (a) is an image obtained in the apparatus 1000 for single-pixel imaging using quantum light when the intensity of noise is 50, (b) is an image obtained in the apparatus 1000 for single-pixel imaging using quantum light when the intensity of noise is 0, and (c) is an image obtained in the apparatus 1000 for single-pixel imaging using quantum light when the intensity of noise is 70 and there is a 50% loss.

It can be seen that in contrast to the result obtained in the general single-pixel imaging that the shape of the target is gradually damaged with respect to the large noise, but in the result obtained in the apparatus 1000 for single-pixel imaging using quantum light according to the exemplary embodiment of the present invention, the shape of the target is hardly damaged compared to the case where there is no noise. That is, the apparatus 1000 for single-pixel imaging using quantum light according to the exemplary embodiment of the present invention is capable of effectively blocking the influence of the external noise.

The quality of the image may be calculated with a Signal to Noise Ratio (SNR) of Equation 2.

$$SNR = \frac{1}{2}\left(\frac{|\mu_t - \mu_b|}{\sigma_t + \sigma_b}\right)^2 \quad \text{(Equation 2)}$$

Herein, the subscripts t and b represent the target area in which the object exists and the background area in which the object does not exist on the image, respectively. µ represents an average of pixel values configuring the corresponding area, and σ represents an average deviation of the pixel values configuring the corresponding area.

In FIG. 4, the SNR in (a) is calculated as 1.65, the SNR in (b) is calculated as 0.52, the SNR in (c) is calculated as 0.11, and in FIG. 5, the SNR in (a) is calculated as 1.66, the SNR in (b) is calculated as 1.51, and the SNR in (c) is calculated as 0.99. Compared to the SNR of the general single-pixel imaging system of FIG. 4, the enhanced ratio of the SNR of the apparatus 1000 for single-pixel imaging using quantum light is 1 in (a), 3 in (b), and 9 in (c) of FIG. 5.

It can be seen that in the case of the image obtained in the general single-pixel imaging system, as the noise increases, the SNR decreases significantly, but in the case of the image obtained in the apparatus 1000 for single-pixel imaging using quantum light according to the exemplary embodiment of the present invention, even though the noise increases, the change in the SNR is small.

The apparatus 1000 for single-pixel imaging using quantum light according to the exemplary embodiment of the present invention is capable of obtain the clear object image by suppressing noise even in the environment in which the intensity of noise is large and loss is generated with exceeding the limit of the general single-pixel imaging system vulnerable to external noise. Therefore, the apparatus 1000 for single-pixel imaging using quantum light according to the exemplary embodiment of the present invention may be used in research fields, such as stealth detection, bio-imaging, object detection in bad weather, and the like.

The accompanying drawings and the detailed description of the invention as described above are only an embodiment of the present invention, which are used for the purpose of describing the present invention but are not used to limit the meanings or the scope of the present invention described in the claims. Therefore, those skilled in the art will understand that various modifications and other equivalent exemplary embodiments are possible therefrom. Therefore, the true technical protection scope of the present invention will be defined by the technical spirit of the accompanying claims.

What is claimed is:

1. An apparatus for single-pixel imaging using quantum light, the apparatus comprising:
    a light source which generates a photon pair through spontaneously parametric down conversion of a non-linear crystal and splits the photon pair into an idler photon of first polarized light and a signal photon of second polarized light;
    a signal processing unit which aligns the signal photon with the first polarized light and modulates the signal photon with a pattern of a spatial light modulator, and sends the modulated signal photon to a target;
    a signal detecting unit which simultaneously measures the idler photon and a signal photon collected after an interaction with the target to obtain an image; and
    an environment implementing unit including a half wave plate and a polarization beam splitter located in front of the target in an optical path of the signal photon sent to the target from the spatial light modulator, and a laser oscillator oscillating laser that is irrelevant to the signal photon,
    wherein the half wave plate simulates a loss of the signal photon sent to the target, and
    a laser oscillated in the laser oscillator travels the same path as a path of the signal photon by the polarization beam splitter to simulate external noise.

2. The apparatus of claim 1, wherein:
the photon pair has a temporal correlation by the spontaneously parametric down conversion, and noise is removed by the simultaneous measurement of the idler photon and the signal photon.

3. The apparatus of claim 1, wherein:
the light source includes:
an optical fiber coupler on which a continuous wave laser is incident;
a quarter wave plate and a half wave plate which cause horizontally polarized light to be incident on the non-linear crystal by adjusting a wavelength of the continuous wave laser in a horizontal direction;
a dichroic mirror which reflects the continuous wave laser passing through the non-linear crystal and allows the photon pair to transmit; and
a polarization beam splitter which splits the photon pair into the first polarized light and the second polarized light.

4. The apparatus of claim 3, wherein:
the light source further includes
a temperature controller which adjusts a temperature of the non-linear crystal to meet a collinear condition in which the photon pair travels the same path as a path of an incident photon of the continuous wave laser.

5. The apparatus of claim 3, wherein:
the light source further includes
an optical filter which allows only the photon pair to transmit and sends the transmitted photon pair to the polarization beam splitter.

6. The apparatus of claim 1, wherein:
the signal processing unit includes:
a quarter wave plate and a half wave plate which align a signal photon of the second polarized light as the first polarized light and makes the aligned signal photon incident on the spatial light modulator; and
a polarization beam splitter which filters a portion in which a polarization direction of the light emitted through the spatial light modulator is changed to make a spatial form of the light be the same as a pattern of the spatial light modulator.

7. The apparatus of claim 6, wherein:
the signal processing unit further includes
a plurality of lens which adjusts a beam width of the signal photon incident on the spatial light modulator in accordance with a size of the spatial light modulator and adjusts a beam width of the signal photon having a pattern of the spatial light modulator.

8. The apparatus of claim 1, wherein:
the signal detecting unit includes:
a first single photon counting module which is connected to a single mode optical fiber to which the idler photon is transmitted;
a multi-mode optical fiber which collects the signal photon; and
a second single photon counting module connected to the multi-mode optical fiber.

9. The apparatus of claim 8, wherein:
the signal detecting unit further includes
a lens unit which decreases the beam width of the signal photo to an original beam width so that the signal photon is coupled to the multi-mode optical fiber.

* * * * *